(12) United States Patent
Zhang et al.

(10) Patent No.: US 7,663,321 B2
(45) Date of Patent: Feb. 16, 2010

(54) ELECTRIC POWER SUPPLY FOR AT LEAST TWO ELECTRODES

(75) Inventors: Jingwei Zhang, Massy (FR); Guillaume Auday, Saint Ouen (FR); Didier Duron, Boulogne Billancourt (FR); Thomas Bertin-Mourot, Paris (FR); Philippe Visage, Oinville sur Montcient (FR)

(73) Assignee: Saint-Gobain Glass France, Courbevoie (FR)

( * ) Notice: Subject to any disclaimer, the term of this patent is extended or adjusted under 35 U.S.C. 154(b) by 389 days.

(21) Appl. No.: 10/565,200

(22) PCT Filed: Jul. 23, 2004

(86) PCT No.: PCT/FR2004/001971

§ 371 (c)(1),
(2), (4) Date: Jul. 26, 2006

(87) PCT Pub. No.: WO2005/011336

PCT Pub. Date: Feb. 3, 2005

(65) Prior Publication Data

US 2007/0007899 A1    Jan. 11, 2007

(30) Foreign Application Priority Data

Jul. 23, 2003    (FR)    .................... 03 08977

(51) Int. Cl.
*H05B 37/02*    (2006.01)
*H01J 7/44*    (2006.01)
(52) U.S. Cl. .................... 315/209 R; 315/41
(58) Field of Classification Search .............. 315/40–46, 315/56–57, 59, 61–62, 70, 72, 89, 91, 177, 315/209 R, DIG. 7, 291, 307
See application file for complete search history.

(56) References Cited

U.S. PATENT DOCUMENTS

| | | | |
|---|---|---|---|
| 4,633,141 A | | 12/1986 | Weber |
| 5,072,155 A | * | 12/1991 | Sakurai et al. ............... 315/219 |
| 5,239,234 A | | 8/1993 | Pischke et al. |
| 6,011,704 A | * | 1/2000 | Coleman ..................... 363/37 |
| 6,020,691 A | * | 2/2000 | Sun et al. ..................... 315/307 |
| 6,324,078 B1 | * | 11/2001 | Naruo et al. ................... 363/17 |
| 6,359,387 B1 | * | 3/2002 | Giannopoulos et al. ....... 315/46 |
| 6,685,803 B2 | * | 2/2004 | Lazarovich et al. ......... 204/164 |
| 2002/0027412 A1 | * | 3/2002 | Yoshida et al. .............. 313/486 |
| 2002/0093295 A1 | | 7/2002 | Okamoto et al. |

FOREIGN PATENT DOCUMENTS

| DE | 198 39 336 | 3/2000 |
|---|---|---|
| DE | 101 15 279 | 10/2001 |

(Continued)

*Primary Examiner*—Douglas W Owens
*Assistant Examiner*—Minh D A
(74) *Attorney, Agent, or Firm*—Oblon, Spivak, McClelland, Maier & Neustadt, P.C.

(57) ABSTRACT

An electrical supply device configured to deliver energy to a structure that includes at least two electrodes and a space containing a gas intended to be excited. The device includes a voltage generator, an inductor connected to the generator and connected to the structure to supply the two electrodes with a periodic voltage of given frequency, and a resonance mechanism for fixing the frequency at substantially the resonant frequency of the system of the structure and the inductor.

14 Claims, 4 Drawing Sheets

FOREIGN PATENT DOCUMENTS

| | | |
|---|---|---|
| EP | 0 374 617 | 6/1990 |
| EP | 0 529 551 | 3/1993 |
| EP | 1 176 853 | 1/2002 |
| EP | 2003173889 | 6/2003 |
| JP | 2001-217090 | 8/2001 |

* cited by examiner

ELECTRIC POWER SUPPLY FOR AT LEAST TWO ELECTRODES

This application is a 371 OF pct/fr04/01971 Jul. 23, 2004.

BACKGROUND OF THE INVENTION

1. Field of the Invention

The subject of the invention is an electrical supply device intended to deliver energy to a structure that includes at least two electrodes and a space containing a gas, the device comprising a voltage generator and an inductor connected to the generator and connected to the structure in order to supply the two electrodes with a periodic voltage of given frequency.

The invention will be described more particularly in the case of an electrical supply for a light source of the flat lamp type, but it may relate to any electrical supply for a structure having at least two electrodes and a gas intended to be excited, the electrodes having to be supplied with energy so as to create between them an electric field that ionizes the gas.

2. Related Art

Flat lamps are generally used for the manufacture of backlit screen devices. They consist of two glass substrates held slightly apart one with respect to the other, generally separated by less than a few millimetres, and hermetically sealed so as to contain a gas under reduced pressure, in which an electrical discharge produces radiation generally in the ultraviolet range, which excites a phosphor substance, which then emits visible light.

In a standard flat lamp structure, a glass substrate carries, on one and the same face, two screen-printed coatings, especially made of silver, in the form of interpenetrated cones constituting a cathode and an anode. This face is turned toward the space containing the plasma gas. Another glass substrate is held at a certain distance from the first by means of discretely positioned spacers and possibly a peripheral frame. A discharge (an electric field) said to be coplanar is produced between the anode and the cathode, that is to say in a direction along the main surface of the glass substrate, which discharge excites the surrounding plasma gas.

The electrodes are protected by a dielectric coating intended, by capacitively limiting the current, to prevent loss of material of the electrodes by ion bombardment near the glass substrate. At least one of the faces of the glass substrates turned toward the space containing the gas also carries a coating of phosphor material, which is excited by the ionization of the gas and thus emits light.

However, in such a structure, the electrical connectors for supplying the electrodes must pass through the sealed enclosure containing the gas, thereby requiring a complex connection system.

One solution to this connection problem is described in French patent application FR 02/10020 which discloses quite another flat lamp structure for which the electrodes are no longer placed inside the enclosure and in a co-planar manner, but on the outside and intended to generate an electric field transverse to the surface of the electrodes.

The electrodes are, for example, placed on the external face of the glass substrates opposite the gas and therefore in two separate planes. Furthermore, at least one of the electrodes is a translucent conductive element, the face that supports this electrode forming an illuminating face for the flat lamp.

Thus, placing the electrodes on the outside of the enclosure means, on the one hand, that the electrical connection is facilitated and, on the other hand, the glass substrates provide the electrodes with capacitive protection against ion bombardment of the gas.

In addition, the above structure proposes a flat illuminating element capable of providing novel options in terms of decoration, display and/or architecture.

This patent application FR 02/10020 does not describe by which means the electrodes are supplied.

One device that can be used is, for example, that given in U.S. Pat. No. 5,604,410. That supply device comprises a voltage supply source delivering a voltage in the form of a train of pulses, that is to say a voltage that periodically drops to substantially zero during a certain lapse of time. This device furthermore includes a voltage amplifier connected to the voltage source and a transformer whose primary winding is connected to the amplifier and whose secondary winding is connected to the electrodes in order to supply them.

The electrical power needed for the device of this United States patent would, especially with lamp areas close to or greater than one $m^2$, be much too high to be delivered and also requires much too bulky a device.

BRIEF SUMMARY OF THE INVENTION

The object of the invention is to provide an electrical supply device for electrodes that makes it possible to limit the electrical consumption and is suitable for any type of structure to be supplied.

For this purpose, the invention proposes an electrical supply device intended to deliver energy to a structure that includes at least two electrodes and a space containing a gas intended to be excited, the device comprising a voltage generator, an inductor connected to the generator and connected to the structure in order to supply the two electrodes with a periodic voltage of given frequency, which device includes what are called resonance means for fixing said frequency at substantially the resonant frequency $f_R$ of the system, which consists of the structure and said inductor.

Thus, the resonance reduces the electrical consumption.

The device according to the invention may be used for example for any flat lamp structure (with any arrangement of the electrodes) and any capacitance of the structure. The resonant frequency $f_R$ is defined by the inductance and the capacitance of the structure.

In a flat lamp configuration already described above and disclosed in French patent application FR02/10020, the capacitance of the structure is determined mainly by the capacitances of the dielectrics that are the glass substrates.

For example, the dimensions of such flat lamps are 100 mm by 100 mm or 1000 mm by 1000 mm, i.e. capacitances of about 30 pF or 3000 pF respectively.

The device according to the invention may also be used equally well in surface treatment and/or deposition using a low-pressure or atmospheric-pressure plasma CVD process.

The low-pressure plasma CVD process consists in placing a surface to be treated in a hermetically sealed structure filled with a gas, at least between two electrodes spaced apart and respectively associated with two dielectrics forming dielectric barriers.

The atmospheric-pressure plasma CVD or APPECVD (atmospheric-pressure plasma-enhanced chemical vapor deposition) process consists in placing a surface to be treated in an open structure containing a gas, at least between two electrodes spaced apart and respectively associated with two dielectrics forming dielectric barriers. The atmospheric-pressure plasma-enhanced technique is described in J. Phys. D: Appl. Phys. 28 (1995) 1661-1669.

The structure is, for example, flat, of cylindrical geometry (with the dielectric barrier covering a cylindrical electrode) or hybrid.

One of the dielectric barriers (with the associated electrode) may support the surface to be treated, which will run along so as to be facing the other dielectric barrier.

The dielectric barriers may be alumina layers or else glass substrates.

The surface to be treated may, for example, be a dielectric, such as a glass substrate or a plastic, on which it is desired to deposit one or more layers in order to obtain a protective or functional coating, such as a solar-protection coating or an electromagnetic shield, or to modify its surface properties. It is possible to deposit, for example, a $TiO_2$ or $SiO_2$ layer.

The resonant frequency $f_R$ is defined by the inductor of the device and the capacitance of the structure, which is determined by the capacitances of the two dielectric barriers, of that of the gas (which depends especially on its height) and possibly of the capacitance of a dielectric to be treated. Thus the total capacitance may vary over a wide range between 150 pF to 1000 pF.

Moreover, for example in the case of flat lamps, the power may be between 10 W and 200 W depending on the desired level of illumination and on the size of the lamp. The components of the electrical supply device are therefore chosen for high-power endurance.

In a first embodiment of the invention, the inductor is connected to one of the electrodes and the resonance means comprise:

first and second switches, the first switch being placed between the generator and the inductor, the second switch being connected to the first switch and to the other of the electrodes; and means for controlling the switches, these means being coupled to means for measuring an image of the current passing through the structure, so as to fix said frequency.

The resonance is then of the primary type.

In this first embodiment, the supply voltage of the structure may be at least partly sinusoidal.

Such a signal waveform with a low slope allows the instantaneous energy consumption to be reduced.

This is because a voltage in the form of pulses has a derivative dV/dt greater than the derivative of a sinusoidal voltage. To obtain the current i (=C.dV/dt), this derivative is multiplied by the capacitance of the dielectrics of the lamp, which depends on the area and the thickness of the said dielectrics, this capacitance not being negligible in the case of large lamp dimensions. In addition, the current i rapidly reaches very high values with such a voltage of the pulse type, resulting in a very high instantaneous power level, which would therefore go counter to saving energy.

In this first embodiment, the device may include means for truncating said voltage, the voltage then remaining at zero for a certain chosen lapse of time instead of crossing 0 at a given instant. Thus, the energy consumption is reduced, the structure being supplied sequentially when the plasma is ignited.

In this first embodiment, the resonance means may be capable of operating for a plurality of resonant frequencies.

In this way, the supply for whatever flat lamp structure, that is to say whatever its dimensions (dielectric capacitances), or for predetermined ranges of dimensions, is provided by this device, which automatically adapts the period of the voltage signal.

In an advantageous second embodiment of the invention, the supply device includes a transformer provided with a primary winding and with a secondary winding forming said inductor, the primary winding being connected to the generator and the secondary winding being connected to the two electrodes, and the resonance means comprise a switch, which is placed in the path from the generator to the primary winding of the transformer, and a control system connected to the switch so as to open and close the switch over a period T, the closing of said switch, which is closed for a duration dt, being triggered by choice at one of the following instants:

at the zero crossing of the current flowing through the structure;

when said voltage crosses a threshold voltage;

at a threshold light level, for example by means of a detection diode; and when the current crosses a threshold current.

The resonance is then of the secondary type and is made possible by an intelligent system for opening and closing the switch.

During the time dt, the structure is supplied with voltage by an energy source—the generator—which is external to it. The secondary winding of the transformer stores energy and the capacitors corresponding to the dielectrics charge up while the switch is closed.

In addition, when the switch is opened, which prevents voltage being supplied from the external energy source, namely the generator, the structure continues however to be supplied with voltage via an energy source that may be termed an internal source, which corresponds to a closed supply circuit consisting of the capacitors corresponding to the dielectrics, which discharge their energy, and the secondary winding of the transformer, which recovers its energy by oscillating at the frequency $f_R$.

In this way, the energy extracted from the generator, and therefore from the electrical mains, is reduced compared with that needed using the supply devices of the prior art, and therefore resulting in an energy saving.

More precisely, at the zero crossing of the current flowing through the structure, the energy delivered by the system consisting of the capacitors corresponding to the dielectrics and of the transformer is exhausted, while new energy is provided by the external source, namely the generator.

Similarly, when the supply voltage crosses a threshold voltage corresponding, for example, to the voltage needed to trigger a discharge in the lamp, the lamp will emit light through the new energy provided by the external source, namely the generator.

This threshold voltage may be predetermined or set by an operator, and it may also be adjustable over time.

In the prior art, the period of the pulse train, the amplitude of the voltage and the time during which the voltage is zero are parameters that depend on the geometry of the electrodes and on the type and thickness of the dielectrics that separate the gas from the electrodes. Consequently, it is necessary to produce a separate supply device according to the configuration of each type of lamp, the characteristics relating to the voltage and supply time being tailored to each device.

It is therefore necessary with such a supply to manufacture a large number of different kinds of supply device, each kind being suitable for one particular type of flat lamp, with different characteristics depending on the dimensions of the lamp, the gas and its volume, and its necessary supply power.

Now, it is difficult to envision, for the mass production of various lamps, designing one particular device for each type of lamp—the manufacturing costs would be too high, resulting in cost prices for the lamps that would be excessive for the consumer.

However, in this second device, the supply for whatever structure, that is to say whatever its dimensions (capacitances of the dielectrics), is provided by this device, which automatically adapts the period of the voltage signal and is small in size.

In the case of a plasma-enhanced CVD structure, any fouling of one or both dielectrics, a change in the nature or size of the substrate to be treated and a change in the size or shape of one of the dielectrics result in a change in the capacitance of the structure which, in this second embodiment, is automatically taken into account.

According to one feature, the supply device may include means for measuring the current that delivers, to the control system, an image of the current flowing through the structure, the closing of the switch within the period T being triggered at the current zero crossing.

According to another feature, the supply device may include means for measuring said voltage, said means being coupled to the control system, the closing of the switch within the period T being triggered when said voltage crosses said threshold voltage.

Preferably, the duration of the time during which the switch is closed can be adjusted according to the energy to be delivered to the structure.

During the time when the switch is closed, a sudden variation in the voltage makes it possible to obtain a pulse current flowing through the lamp that is sufficient to turn the lamp on. The intensity and the direction of this sudden variation are chosen depending on the instant at which the closing of the switch is triggered and on the duration dt of the time it is closed.

This sudden variation may result, for example, in an increase in the amplitude of the voltage, for example by creating a positive (or alternatively negative) voltage "ramp" when a positive (or alternatively negative) threshold voltage value is reached.

This sudden variation may also result in passage from a given positive threshold voltage to the corresponding negative value.

The sudden variation in the voltage may be obtained, for example, by applying a DC voltage of substantially constant amplitude to the primary winding for the duration dt, which is cut-off thereafter, thus forming a pulse of duration dt.

Preferably, the voltage may be symmetrical with respect to zero for good charge flow.

The frequency therefore varies depending on the systems, for example from 10 kHz to a few MHz.

Preferably, said frequency (and therefore substantially the resonant frequency) is between 10 and 300 kHz, preferably between 40 and 50 kHz for better discharge.

An inductance value (corresponding to that of the secondary winding in the presence of a transformer) will be chosen, for example, depending on the capacitance of the structure so that the resonant frequency is within the aforementioned advantageous range.

According to the invention, such a supply device may advantageously be used for supplying at least two electrodes of a structure forming a flat lamp.

The invention also proposes an assembly comprising:
- a structure that includes at least two electrodes and a space containing a gas; and
- said electrical supply device, as defined above.

The structure may include two dielectrics associated respectively with the two facing electrodes and spaced apart so as to create said space.

In one advantageous embodiment, the structure forms a flat lamp for a backlighting system or a flat lamp for architectural, decorative and/or indicating illumination.

In another embodiment, the structure forms part of a deposition system for an atmospheric-pressure or low-pressure plasma CVD process.

BRIEF DESCRIPTION OF THE SEVERAL VIEWS OF THE DRAWINGS

The invention will now be described in greater detail in conjunction with the appended drawings, in which.

DETAILED DESCRIPTION OF THE INVENTION

Figure 1:
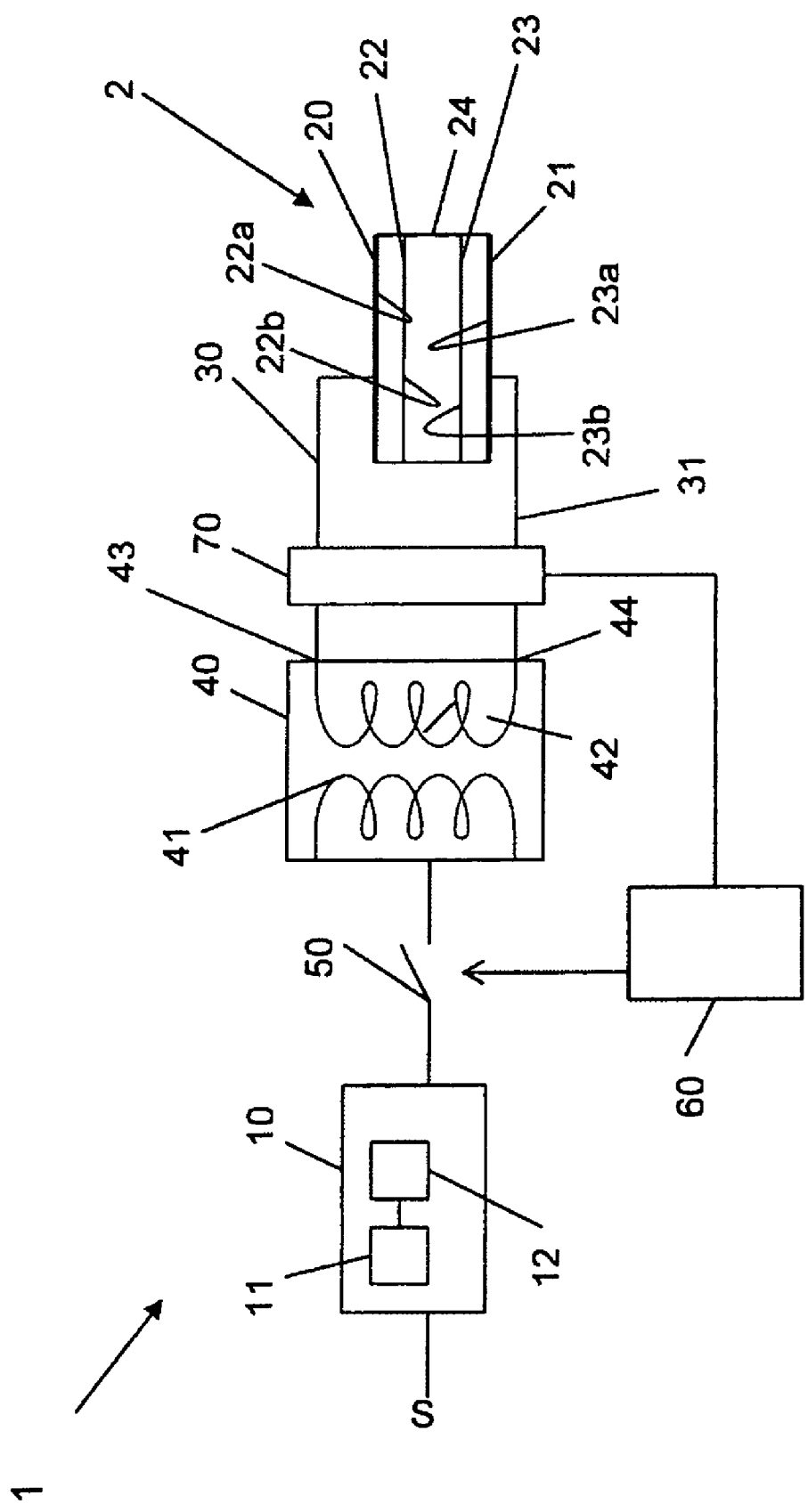
FIG. 1 shows a diagram of the electrical supply device associated with a structure to be supplied, for example of the flat lamp type, in a first embodiment of the invention.

FIG. 1 illustrates an electrical supply device 1 according to the invention that can supply electrical energy to at least two electrodes 20, 21 of a structure 2 in a first embodiment.

The structure 2 comprises the electrodes 20, 21, two dielectric elements 22, 23 facing each other a certain distance apart, on each of which one of the electrodes is placed, and at least one gas 24 contained in the space separating the two dielectric elements, the electrodes being associated in this structure example with the external faces 22a, 23a of the dielectric elements that are on the opposite side from the faces 22b, 23b facing the gas. The dielectric elements have a capacitance that depends on the area of the electrodes with which they are associated.

This structure may constitute, for example, a flat lamp. In this case, the structure as such is hermetically sealed.

The structure has, as dielectric elements 22, 23, two glass substrates which are held apart from each other leaving a space of less than a few millimetres, by means of spacers and are sealed one with respect to the other by a frame made of glass frit. The external faces of the glass sheets are covered by the electrodes 20, 21, and the internal face of at least one glass substrate is coated with a phosphor material.

The gas 24 filling the space between the two glass substrates is at a reduced pressure, generally of around a few tenths of an atmosphere, and consists, for example, of xenon or possibly a xenon/neon mixture. Finally, the electrodes 20, 21 are formed in a known manner by conductive layers.

For further details about this flat lamp configuration, the reader may refer to French patent application FR 02/10020.

The electrodes 20 and 21 of the structure 2 are connected by connectors 30 and 31 respectively, such as flexible shims, to the electrical supply device 1.

The structure 2 may also constitute part of a low-pressure plasma CVD surface treatment and/or deposition system. In this case, the dielectric elements 22, 23 are formed, for example, by two alumina elements (for example 0.5 mm±0,1 mm), which face each other (for example 5 or 6 mm apart) and bear, on one of their faces, that opposite the opposing face, an electrode 20 or 21 consisting, for example, of conductive layers.

These dielectric elements associated with the electrodes are enclosed in a hermetically sealed enclosure containing the gas 24 at low pressure.

The structure 2 may also constitute part of an atmospheric-pressure plasma CVD surface treatment and/or deposition system, in which case the structure is open.

To give an example, a $TiO_2$ layer is deposited on a clean glass heated to a temperature of 260° C. A gas mixture consisting of helium (He) and oxygen ($O_2$) is introduced.

An organometallic precursor, namely titanium tetrachloride ($TiCl_4$), is poured into a heated bubbler and a carrier gas (He) is injected into the bubbler in order to transport the organometallic vapor. In equilibrium, the total pressure is maintained at 1013 mbar±50 mbar.

The electrical supply device 1 comprises a voltage generator 10, a transformer 40 connected between the voltage generator 10 and the two electrodes 20, 21, a switch 50 of the electronic type, connected between the voltage generator 10 and the transformer 40, the switch 50 being intended to be closed or open in order to supply or not supply the transformer, a system 60 for controlling the switch 50 that is capable of opening and closing it, and means 70 for measuring the current in the path of the structure 2 between the transformer and said structure.

The voltage generator 10 is connected upstream to the mains, which delivers a single-phase 220 volt voltage with a frequency of 50 Hz. This generator includes, in a known manner, from the upstream end to the downstream end, an EMC (electromagnetic compatibility) filter block 11, which is used to filter the mains voltage, isolating the noise therefrom, and a rectifier block 12, which is used to deliver a DC voltage of substantially constant amplitude, chosen to be negative in this configuration, means for protecting the electronic components being included in this generator.

The transformer 40 has a primary winding 41, which is connected to the rectifier block 12 of the voltage generator, and a secondary winding 42, the terminals 43, 44 of which are connected to the electrodes 20, 21 via the connectors 30 and 31 respectively.

The switch 50 connected between the generator 10 and the transformer 40 is used to supply the transformer sequentially by means of the control system 60. This control system 60 generates a switching period T of the switch 50 such that $T=1/(2f_R)$, with $f_R$ the resonant frequency of the system comprising the structure 2 and the secondary winding 42 of the transformer 40.

The resonant frequency $f_R$ is defined by the output inductance of the transformer 40 and the capacitance of the structure 2, the capacitance of the structure being determined mainly by the capacitances of the dielectrics 22 and 23, namely the glass substrates.

Closing the switch at each period $T=1/(2f_R)$ allows the structure 2 to be supplied with voltage from an external supply source (the generator 10) at the precise periods when the structure has need of it in order to operate, for example in the case of a flat lamp each time the lamp is ready to be turned off. Thus, the structure has no need to be supplied continuously from this external source, allowing energy to be saved.

Owing to the fact that this period depends on the frequency of the system, the moment of closure is optimized, conduction does not need to take place in an anticipated manner, while the structure does not yet need an external supply of voltage.

The resonant frequency $f_R$ is determined by the characteristics of the structure 2, namely the nature of the dielectrics, the distance between the dielectrics, the thickness of the dielectrics, and the surface and nature of the electrodes, and by the output inductance of the transformer, said frequency being, for example, chosen between 40 and 50 kHz.

In the case of the plasma CVD structure, a lower resonant frequency may be chosen, for example in order to reduce the deposition reaction rate and to obtain greater stability.

The switch 50 remains closed for a time dt, that is to say it is conducting for this time, during which light emission by the lamp occurs, that is to say during the illumination time of the lamp. The longer this time dt, the higher the light energy of the lamp. Advantageously, this time dt can be adjusted manually in order to finely control the brightness of the lamp.

The means 70 for measuring the current, which are placed between the secondary winding of the transformer and the structure 2, deliver to the control system 60 the image of the current flowing through the structure 2. Thus, the current zero crossing automatically closes the switch 50.

The device of the invention will now be described in relation to FIG. 2 and with reference, by way of example for supplying a structure 2, to the supply of a flat lamp in order to turn it on.

Figure 2:
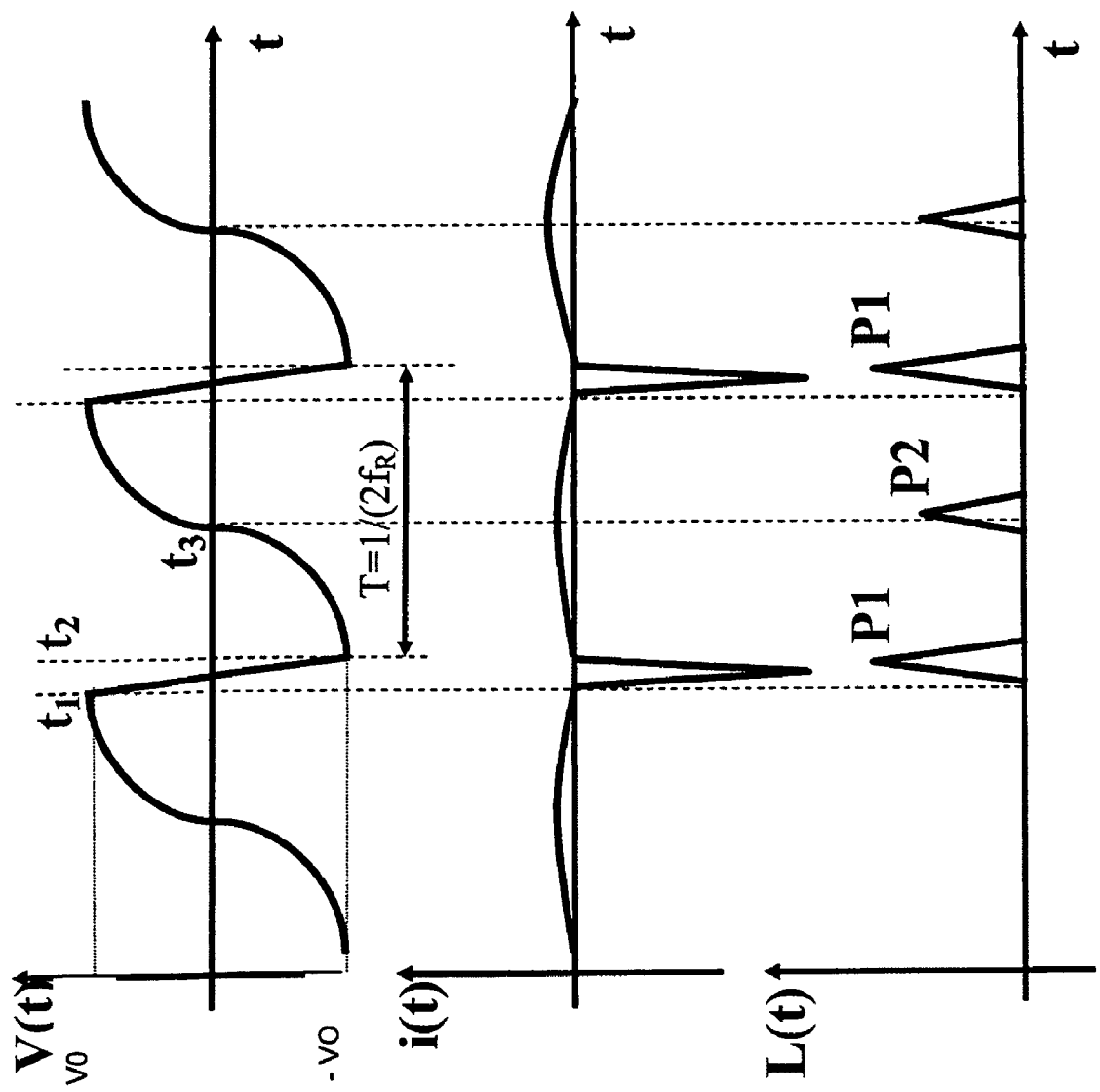
FIG. 2 illustrates, as a function of time, the voltage across the terminals of the flat-lamp structure, the current in the lamp and the light energy delivered by the lamp according to the first embodiment.

FIG. 2 illustrates, as a function of time, the voltage V(t) across the terminals of the secondary winding of the transformer, that is to say the voltage across the terminals of the lamp, the current i(t) in the lamp and the light energy L(t) delivered by the lamp.

At time $t_1$, the current i(t) is equal to 0 and the voltage V(t) is equal to V0. The switch 50 is in the closed position so that it is conducting in order to supply the primary winding 41 of the transformer with voltage from the generator 10.

The voltage delivered to the primary winding of the transformer is transformed in the secondary winding, which then supplies the lamp, that is to say the two electrodes 20 and 21. The amplitude of V(t), i.e. V0, is equal to or greater than the voltage needed to ionize the gas.

For flat lamps, the amplitude of V(t) may for example be between 300 V et 3 kV, typically around 1 to 2 kV.

The conduction taking place for the time dt also allows energy to be stored in the secondary winding of the transformer, this energy being proportional to the conduction time dt of the switch, and the capacitors corresponding to the two dielectrics 22, 23 to be charged up with energy.

Also during this time dt, since the gas is ionized, on the one hand a pulse current i(t) goes through the lamp and, on the other hand, the lamp is lit, manifested by the peak P1 of the light energy L(t).

At the instant $t_2$, that is to say after the time $dt=t_2-t_1$, namely the time set by the manufacturer or the user, V(t) is equal to −V0.

The control system 60 opens the switch 50. The primary winding of the transformer is then no longer supplied, and the energy stored in the secondary winding of the transformer and the energy stored in the capacitors corresponding to the dielectrics are then returned to the lamp as a sinusoidal supply voltage V(t) oscillating at the resonant frequency $f_R$ of the system formed by the structure 2 and the secondary winding 42 of the transformer, it being possible for a current i(t) to continue to flow through the structure 2.

Near the zero crossing of the supply voltage V(t), i.e. at the instant $t_3$, the voltage across the terminals of the dielectric elements, which is equal to the amplitude of V(t), is applied inversely to the gas, again ionizing the gas in order to light the lamp again (peak P2 of the light energy L(t)).

The voltage V(t) continues to vary up to the time $t_1+T$, where $T=1/(2f_R)$ which corresponds to the detection of the zero crossing of the current i(t), whereby, since the gas is no longer sufficiently ionized, the lamp is no longer lit.

So as to light the lamp again, it is necessary for the switch 50 to close again at this instant $t_1+T$ of detection of the current zero crossing. The control system 60 therefore again closes the switch 50, thereby ensuring, during the new period dt, a new supply for the transformer and therefore for the lamp, resulting in new ionization and new illumination (new peak P1), with a new charge from the dielectrics.

These operations of closing and opening the switch 50 are repeated during the desired time for supplying the electrodes of the lamp, that is to say during the desired illumination time of the lamp.

Thus, by measuring the current, the control system 60 makes it possible to precisely control the moment when it is necessary to resupply the electrodes of the structure. Thus, it is possible to connect any structure 2 with specific impedance characteristics, and the supply device 1 of the invention, after the switch 50 has opened, will automatically close it again as soon as the current crosses zero, which instant corresponds to a switching period T equal to $1/(2f_R)$, $f_R$ being the resonant frequency of the system comprising the structure 2 and the secondary winding 42 of the transformer 40.

In a variant of this first embodiment, the supply device 1 of the invention automatically triggers the closing of the switch 50 when V(t)=V0, the threshold voltage measured by suitable means, which replace the means 70, this instant corresponding to a switching period T equal to $1/(2f_R)$.

Figure 3:
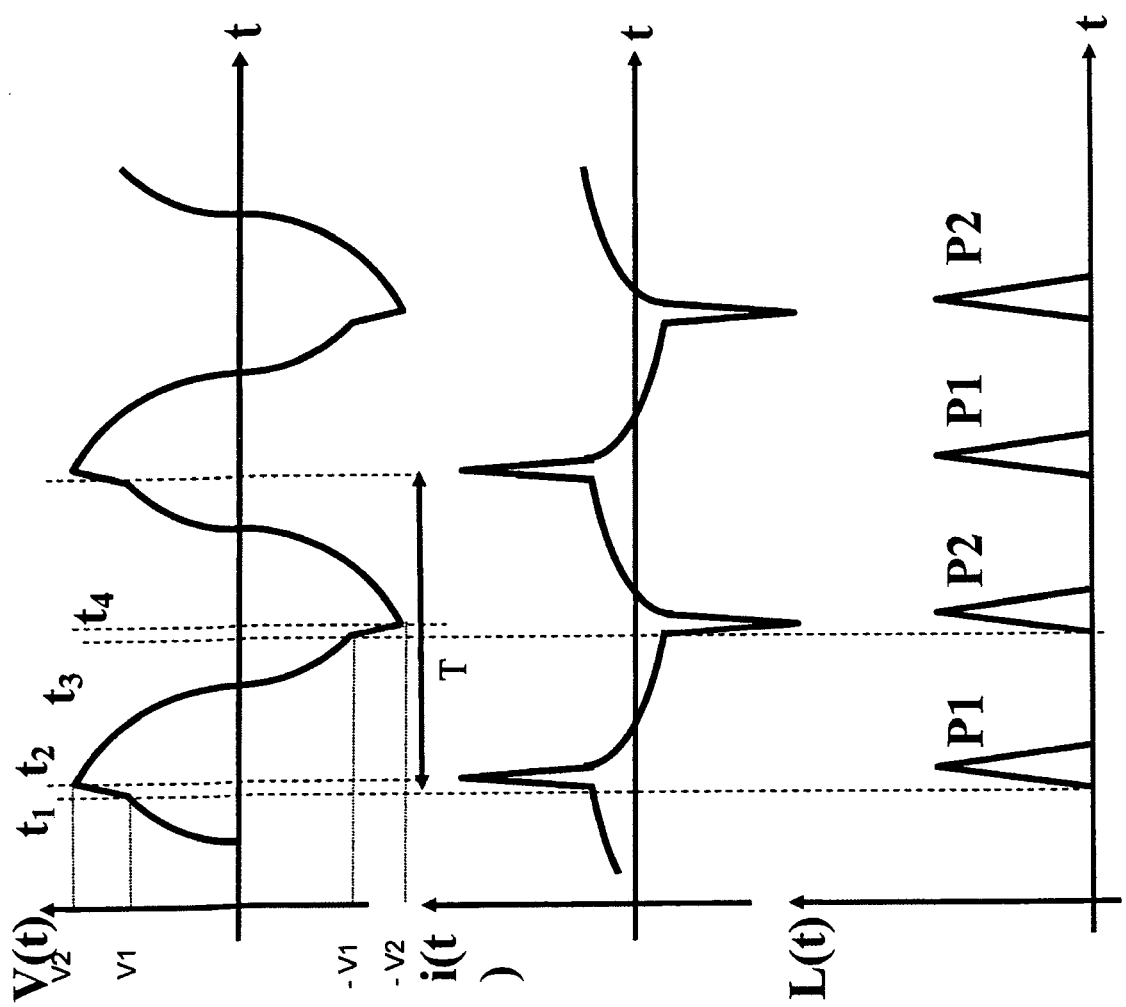
FIG. 3 illustrates, as a function of time, the voltage across the terminals of the flat-lamp structure, the current in the lamp and the light energy delivered by the lamp according to an alternative form of the first embodiment.

FIG. 3 illustrates, as a function of time, the voltage across the terminals of the structure, for example of the flat lamp type, the current in the lamp and the light energy delivered by the lamp, according to a variant of the first embodiment.

Means for measuring the voltage V(t) replace the current measurement means 70.

At time $t_1$, the voltage across the terminals of the lamp is V1, which corresponds to a first threshold voltage for switching, and the switch 50 is in the closed position so that it is conducting in order to supply the primary winding of the transformer with voltage from the generator 10, which therefore delivers a positive voltage.

This voltage delivered to the primary winding of the transformer is transformed in the secondary winding, which then supplies the lamp, that is to say the two electrodes 20 and 21.

The conduction taking place for the time dt makes it possible moreover to store energy in the secondary winding of the transformer, this energy being proportional to the conduction time dt of the switch, and to charge the capacitors corresponding to the two dielectrics 22, 23 with energy.

Still during this time dt, since the gas is ionized, on the one hand a pulse current i(t) flows through the lamp and, on the other hand, the lamp is lit, manifested by the peak P1 of the light energy L(t).

At the instant $t_2$, that is to say at the end of the time $dt=t_2-t_1$, the time assigned by the manufacturer or the user, the voltage across the terminals of the lamp V(t) is equal to V2, which is greater than or equal to the voltage needed to ionize the gas. The control system 60 then opens the switch 50.

The primary winding of the transformer is then no longer supplied, and the energy stored in the secondary winding of the transformer and the energy stored in the capacitors corresponding to the dielectrics is then returned to the lamp as a sinusoidal supply voltage V(t) oscillating at the resonant frequency $f_R$ of the system formed by the lamp 2 and the secondary winding 42 of the transformer, it being possible for a current i(t) to continue to flow through the lamp.

The voltage V(t) continues to change up to the time $t_3$, which corresponds to a second threshold voltage −V1 for switching. The switch 50 is then in the closed position, so that it is conducting in order to supply the primary winding of the transformer with voltage from the generator 10, which then delivers a negative voltage.

This voltage delivered to the primary winding of the transformer is transformed in the secondary winding, which then supplies the lamp, that is to say the two electrodes 20 and 21.

The conduction taking place for the time $dt=t_4-t_3$ also makes it possible to store energy in the secondary winding of the transformer, which energy is proportional to the conduction time dt of the switch, and to charge the capacitors corresponding to the two dielectrics 22, 23 with energy.

Still during this time dt, since the gas is ionized, on the one hand a pulse current i(t) flows through the lamp and, on the other hand, the lamp is lit, manifested by the peak P2 of the light energy L(t).

At the instant $t_4$, that is to say at the end of the time dt, which time is assigned by the manufacturer or the user, the voltage across the terminals of the lamp V(t) is equal to −V2. The control system 60 then opens the switch 50.

Once again, the primary winding of the transformer is then no longer supplied, and the energy stored in the secondary winding of the transformer and the energy stored in the capacitors corresponding to the dielectrics is then returned to the lamp as a sinusoidal supply voltage V(t) oscillating at the resonant frequency $f_R$ of the system consisting of the lamp 2 and secondary winding 42 of the transformer, it being possible for a current i(t) to continue to flow through the lamp.

The voltage V(t) continues to change up to the time $t_1$+T. So as to ensure that the lamp is lit again, it is necessary for the switch 50 at this instant $t_1$+T to be closed again. The control system 60 therefore closes the switch 50 again, thereby ensuring during the new period dt a new supply for the transformer and therefore for the lamp, generating new ionization and new illumination (new peak P1) with a new charge from the dielectrics.

Similarly, it is necessary for the switch 50 to again be closed at the instant $t_3$+T, in the negative part of V(t).

These operations of closing and opening the switch 50 are repeated during the desired time for supplying the electrodes of the lamp, that is to say during the desired illumination time of the lamp.

Thus, by measuring the threshold voltage V1 (or alternatively −V1), the control system 60 makes it possible to control precisely the moment when it is necessary to resupply the electrodes of the structure.

In addition, it is possible to connect any structure 2 with specific impedance characteristics, and the supply device 1, after the switch 50 has opened, will automatically close it again as soon as one of the values V1 or −V1 is reached.

The period T depends on the threshold voltage V1 (or alternatively −V1) and on the amplitude V2 (or alternatively −V2). For V1=V2, a perfect sinusoid and $T=1/f_R$ are obtained. For V1=½V2, $T=0.75/f_R$ is obtained.

Figure 4:
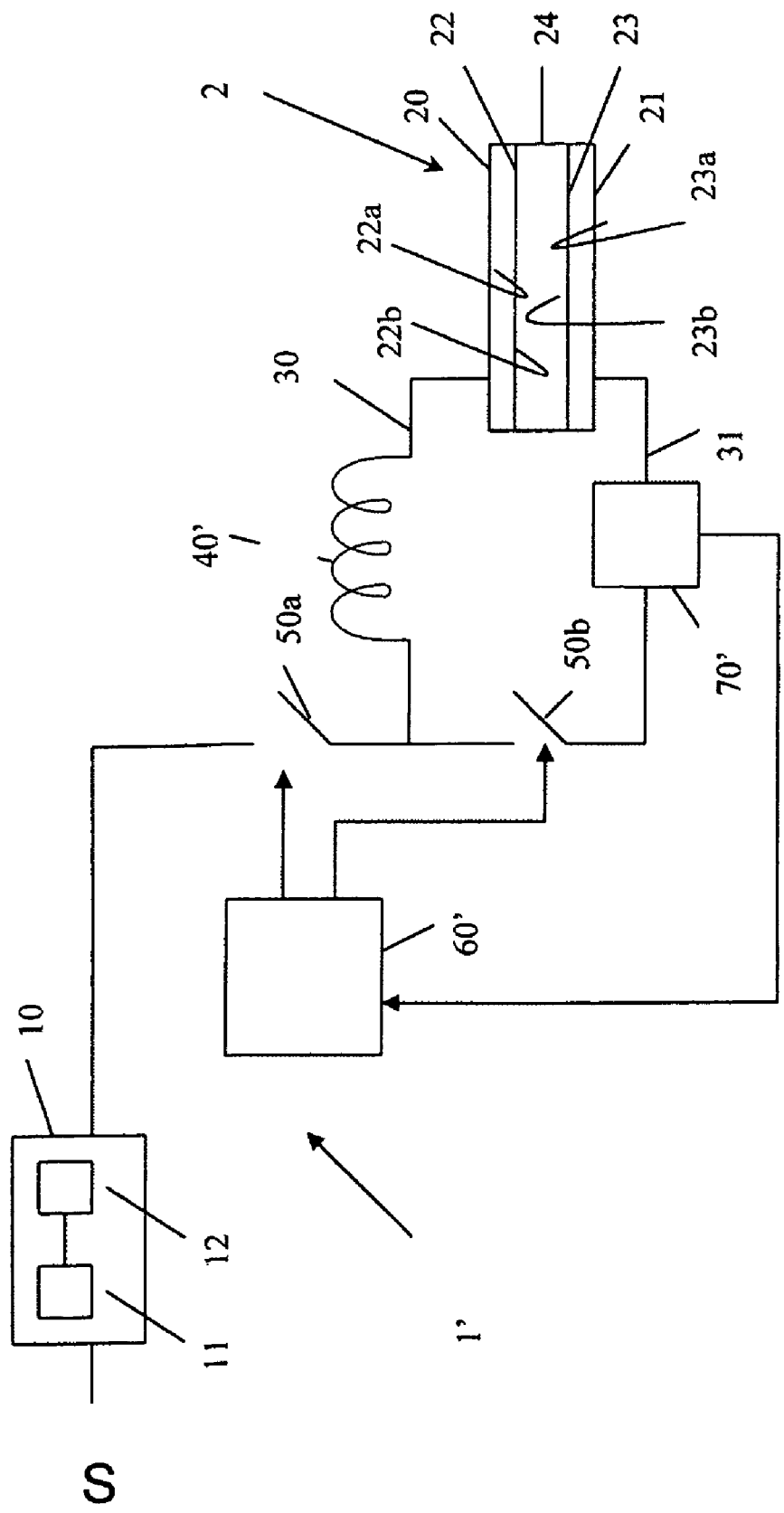
FIG. 4 shows a diagram of the electrical supply device associated with a structure to be supplied, for example of the flat lamp type, in a second embodiment of the invention.

FIG. 4 illustrates an electrical supply device 1' according to the invention that can supply electrical energy to at least two electrodes 20, 21 of a structure 2 in a second embodiment.

The elements fulfilling a function similar to the elements described in relation to FIG. 1 are referenced by the same numbers as the latter and will not be described again in detail below.

The electrical supply device 1' comprises a voltage generator 10, an inductor 40', which is connected to one of the electrodes 20 and to the generator 10, and resonance means which comprise:

- a first switch 50a, of the electronic type, placed between the generator 10 and the inductor 40';
- a second switch 50b of the electronic type, connected to the first switch and to the other of the electrodes 21; and
- means 60' for controlling the switches, these means being coupled to means 70' for measuring an image of the current flowing through the structure 2, which are placed between the second switch 50b and the other electrode 21 so as to fix the frequency of the supply voltage of the structure substantially at the resonant frequency $f_R$.

Thus, the supply voltage for the structure is a sinusoid of period $T=1/f_R$. The device 1' therefore delivers a signal in primary resonance with the structure 2 to be supplied, thereby making it possible to reduce the electrical consumption.

For a given value of the total capacitance of the structure 2, it is preferable to choose an inductor 40' making it possible to obtain a resonant frequency optimized for the discharge.

The invention claimed is:

1. An electrical supply device configured to deliver energy to a structure that includes at least first and second electrodes and a space containing a gas to be excited, the device comprising:
    a voltage generator;
    an inductor in the form of a transformer provided with a primary winding and with a secondary winding, the primary winding connected to the voltage generator and the secondary winding connected to the first and second electrodes to supply the first and second electrodes with a periodic voltage of a frequency; and
    resonance means for fixing the frequency at substantially the resonant frequency of the system of the structure and the inductor;
    wherein the resonance means comprises a switch placed in a path from the voltage generator to the primary winding of the transformer, and a control system connected to the switch to open and close the switch over a period, wherein closing of the switch, which is closed for a duration, is triggered by choice at one of the following instants:
    at a zero crossing of the current flowing through the structure;
    when the voltage crosses a threshold voltage;
    at a threshold light level; or
    when the current flowing through the structure crosses a threshold current.

2. The supply device as claimed in claim 1, wherein the voltage is at least partly sinusoidal.

3. The supply device as claimed in claim 1, further comprising means for truncating the voltage.

4. The supply device as claimed in claim 1, wherein the resonance means is configured to operate for a plurality of resonant frequencies.

5. The supply device as claimed in claim 1, further comprising means for measuring the current that delivers, to the control system, an image of the current flowing through the structure, the closing of the switch within the period being triggered at the current zero crossing.

6. The supply device as claimed in claim 1, further comprising means for measuring the voltage coupled to the control system, the closing of the switch within the period being triggered when the voltage crosses the threshold voltage.

7. The supply device as claimed in claim 1, wherein the duration of the time during which the switch is closed is adjusted according to energy to be delivered to the structure.

8. The supply device as claimed in claim 1, wherein frequency is between 10 and 300 kHz.

9. The use of the supply device as claimed in claim 1 for supplying at least first and second electrodes of a structure forming a flat lamp.

10. An assembly comprising:
    a structure that includes at least first and second electrodes and a space containing a gas; and
    the supply device as claimed in claim 1.

11. The assembly as claimed in claim 10, wherein the structure includes two dielectrics associated respectively with the first and second electrodes and spaced apart so as to create the space.

12. The assembly as claimed in claim 10, wherein the structure forms a flat lamp for a backlighting system or a flat lamp for architectural, decorative, and/or indicating illumination.

13. The assembly as claimed in claim 10, wherein the structure forms part of a deposition system for a plasma CVD process.

14. The supply device as claimed in claim 1, wherein the control system opens and closes the switch over a period $T=1/(2\,fr)$, in which fr is the resonant frequency of the system of the structure and the inductor.

* * * * *